United States Patent [19]

Kight

[11] 4,151,328

[45] Apr. 24, 1979

[54] SELF-WELDING LAMINATE COMPOSITIONS

[75] Inventor: Jack M. Kight, Greenville, S.C.

[73] Assignee: W. R. Grace & Co., Duncan, S.C.

[21] Appl. No.: 867,745

[22] Filed: Jan. 9, 1978

[51] Int. Cl.² .............................................. B32B 27/06
[52] U.S. Cl. ................................... 428/483; 426/106; 426/127; 426/129; 426/415; 428/518; 428/520; 526/317
[58] Field of Search ................... 428/483, 520, 518; 526/317; 426/106, 415, 127, 129

[56] References Cited

U.S. PATENT DOCUMENTS

| | | | |
|---|---|---|---|
| 3,132,120 | 5/1964 | Graham et al. | 260/78.5 |
| 3,215,678 | 11/1965 | Adelman | 526/317 |
| 3,520,861 | 7/1970 | Thomson et al. | 260/88.1 |
| 3,573,125 | 3/1971 | Elliott | 156/244 |
| 3,625,348 | 12/1971 | Titchenal | 206/46 F |
| 3,647,485 | 3/1972 | Seiferth et al. | 428/518 |
| 3,976,626 | 8/1976 | Turck | 526/317 |
| 4,010,305 | 3/1977 | Wang | 425/520 |
| 4,021,504 | 4/1977 | Conrad | 526/317 |
| 4,053,540 | 10/1977 | Argurio et al. | 526/5 |
| 4,070,533 | 1/1978 | Papantoniou | 526/317 |

FOREIGN PATENT DOCUMENTS 834274  2/1970  Canada.

*Primary Examiner*—George F. Lesmes
*Assistant Examiner*—E. Rollins Buffalow
*Attorney, Agent, or Firm*—John J. Toney; William D. Lee, Jr.; John B. Hardaway

[57] ABSTRACT

A film useful as a packaging material having a self-adhering layer on the interior thereof has improved optical and adhesion characteristics. The self-adhering layer is composed of a terpolymer of ethylene, a vinyl ester and an alkenoic acid. The saran layer is plasticized with a polyester to synergistically improve both the optical and adhesive characteristics of the composite laminate.

7 Claims, 2 Drawing Figures

```
PLASTICIZED SARAN
TERPOLYMER
```

| PLASTICIZED SARAN |
|---|
| TERPOLYMER |

SELF-WELDING LAMINATE COMPOSITIONS

BACKGROUND OF THE INVENTION

This invention relates generally to the art of packaging and more particularly to the art of packaging with flexible transparent film which self-adheres during the packaging process.

Articles such as food stuffs, clothing and the like have been commonly packaged in flexible plastic bags or containers which are impervious to the passage of air and other deleterious gasses as well as liquids and moisture.

Packaging processes utilizing a laminate of a self-adhering plastic material and a structural layer of a copolymer of vinylidene chloride and vinyl chloride (saran) is described in U.S. Pat. No. 3,625,348. By the process described therein, a container formed of this laminate material is utilized for packaging such that the self-adhering layer faces an article to be packaged and adheres to itself and conforms to the article shape during a heating step at a relatively low temperature. A preferred embodiment of this patent utilizes an oriented layer of saran with a self-adhering layer of a copolymer of ethylene and vinyl acetate. In this embodiment a packaged article may be placed within a container of this laminate with the self-adhering layer facing the article as well as itself. By evacuating the container and immersing the thus filled container within water maintained at a temperature near the boiling point thereof, the self-adhering layer adheres tightly to itself while at the same time, the oriented saran layer shrinks to provide a tightly packaged article surrounded by an adherent material. The saran layer in such a structure provides strength and shrinkability to the overall structure while the copolymer of ethylene and vinyl acetate self-adheres to provide protection from the ingress of deleterious substances should a puncture occur.

While packages composed of the film described in the above referenced patent are highly satisfactory for many applications, there are shortcomings of the prior art structure which the art heretofore has neither recognized nor eliminated.

SUMMARY OF THE INVENTION

It is thus an object of this invention to overcome the shortcomings of the prior art self-adhering laminate films.

It is a further object of this invention to provide a self-adhering laminate composition having improved clarity.

It is a further object of this invention to provide a laminate film of improved clarity and having improved adhesion between the layers thereof.

These as well as other objects are accomplished by utilizing a laminate film composition wherein one layer is composed of a saran polyester blend and the self-adhering layer thereof is composed of a terpolymer of ethylene, a vinyl ester and an alkenoic acid.

DETAILED DESCRIPTION

Figures 1, 2:
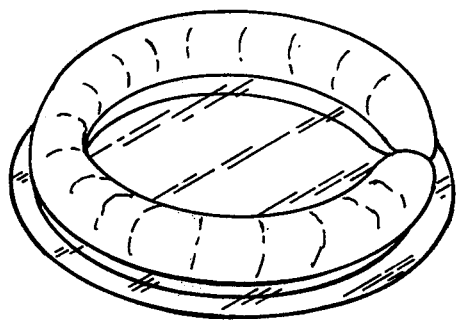
FIG. 1 schematically illustrates a laminate in accordance with this invention.
FIG. 2 illustrates a packaged article produced in accordance with this invention.

According to this invention it has been found that the conventional self-welding two-ply container possesses a cloudiness that interfers with the optical clarity of the resulting film and packaged product. This cloudiness has been found to be brought about partly by differences in the refractive indices of the saran layer and the self-adhering layer. Thus in accordance with this invention it has been found that a source of the cloudiness problem is the conventional use of an ethylene vinyl acetate copolymer blended with the saran layer to act as a plasticizer and to promote the adhesion to the self-adhering layer. This problem stems not only from the lack of clarity of the saran layer along but also from the cloudiness of the saran layer in combination with the conventional ethylene vinyl acetate self-adhering layer. Thus in accordance with this invention it was found that the clarity problem could not be solved by improving the clarity of a single layer but the problem had to be solved by improving the clarity of both layers as well as providing an overall combination in which the two layers are compatable with one another. The problem which is thus solved by this invention is partially solved by eliminating the ethylene vinyl acetate copolymer in the saran layer and replacing it with a polyester which is to be further described below for the purposes of plasticizing the saran and promoting adhesion between the saran layer and the self-adhering layer. While this change in formulation significantly increased the clarity of the saran-layer it does little to increase the clarity of the two-ply structure. Thus this invention requires the replacement of the conventional ethylene vinyl acetate copolymer self-adhering layer with a terpolymer of ethylene, a vinyl ester and an alkenoic acid. Thus the two-ply structure of this invention is the result of a synergistic effect produced by the compatability of the two layers individually. Thus if the saran polyester composition is utilized in combination with the old ethylene vinyl acetate self-adhering copolymer layer, no significant increase in clarity is observed. Likewise if the terpolymer of this invention is utilized in combination with the old saran formulation no significant increase in clarity is produced. However, when both formulations are utilized in combination with one another a significant and synergistic increase in clarity and adhesion is readily observable.

While cloudiness is the most accurate term for describing the optical quality which is improved by this invention, the term "haze" is used interchangeably therewith since haze is a quantitative measurement of this optical quality.

The layers of the packaging film according to this invention are adhered together along substantially coextensive surfaces thereof. The multi-layer plastic packaging material of this invention generally has a thickness in the range from 0.1 to about 20 mils (2.5 to 500 micrometers), preferably from about 0.5 to about 5 mils (13 to 125 micrometers). The layer of self-adhering material generally has a thickness from about 0.05 to about 3 mils (1.3 to 75 micrometers) and preferably from about 0.2 to about 0.8 mils (5 to 20 micro-meters). The layer of saran generally has a thickness from about 0.5 to about 15 mils (13 to 380 micrometers), preferably from about 1 to about 5 mils (25 to 125 micrometers).

The term "saran" is used throughout this specification to refer to the conventionally utilized copolymer containing from 70 to about 90 weight percent of polymerized vinylidene chloride and from about 10 to about 30 weight percent of polymerized vinyl chloride. The term "saran" also includes, as well as the vinylidene chloride and vinyl chloride copolymer, incidental stabilizers and plasticizers such as 3 to 6 percent di-n hexyl azelate, 1 to 4 percent di-isobutyl adipate, one-half to 3 percent epoxidized lineseed oil and less than about 1 percent of an amide wax.

In accordance with this invention it has been found that the use of a polyester additive to the saran resin in an amount from about one-half to about 5 weight percent decreases the cloudiness of a saran film and improves the adhesion between a saran layer and an adjoining contiguous self-adhering layer. The polyester utilized as a plasticizer in this invention has a molecular weight between 1,000 and 10,000 and is produced by an equimolar esterification reaction between adipic acid, azelaic acid or sebacic acid and propylene glycol, 1, 3-butane diol, 1, 4-butane diol or neopentyl glycol and wherein the end group of the polyester is hydroxyl, carboxyl or esterified by aliphatic (C1 to C18), alicyclic aliphatic, heterocyclic and aromatic monocarboxylic acids or monoalcohols. A preferred polypropylene glycol adipate or sebacate polyester plasticizer utilized in this invention is characterized as follows:

| Molecular Weight (approx.) | 8000 |
| Appearance | Clear, viscous liquid |
| Color | Amber |
| Acid Number (max.) | 3.0 |
| Saponification Number | 585–592 |
| Specific Gravity at 25° C. | 1.153 |
| Refractive Index at 25° C. | 1.466 |

When using the preferred saran polyester blend of this invention as a structural and barrier layer, it has been found that the use of a terpolymer of ethylene/vinyl ester/alkenoic acid as the self-adhering layer produces a resulting film with synergistically improved optical and adhesion properties. The self-adhering layer of this invention is formed of a terpolymer of ethylene, a vinyl ester and an alkenoic acid. Particularly effective vinyl esters include vinyl acetate, vinyl propionate, methylmethacrylate, ethyl methacrylate, ethyl acrylate, isobutyl acrylate and the like.

The alkenoic acid useful in forming the terpolymer of the self-adhering layer of this invention is an alpha-beta ethylenically unsaturated carboxylic acid having from 3 to about 10 carbon atoms per molecule of the acid. Suitable acids include acrylic acid, meth-acrylic acid, itaconic acid, methylhydrogen maleate, maleic acid, acrylic acid and methylmethacrylate copolymers; methacrylic acid, ethyl acrylate copolymers, itaconic acid-methylmethacrylate copolymers, methylhydrogen maleate-ethyl acrylate copolymers, methacrylate acid-vinyl acetate copolymers, acrylic acid-vinyl alcohol copolymers, propylene-acrylic acid copolymers, styrene-acrylic acid copolymers, methacrylic acid-acrylonitrile copolymers, fumaric acid-vinyl methyl ether copolymers, vinyl chloride-acrylic acid copolymers, vinyl chloride-methacrylic acid copolymers.

The terpolymer of this invention may be prepared by known techniques such as that described in U.S. Pat. No. 3,132,120 and U.S. Pat. No. 3,520,861. Terpolymers for use in this invention are prepared so as to have at least 60 weight percent ethylene, 20 to near 40 weight percent vinyl ester and 0.1 to 10 weight percent alkenoic acid. The preferred composition for use in this invention is a terpolymer prepared from about 65 weight percent ethylene 30 weight percent vinyl acetate and about 5 weight percent of either acrylic or methacrylic acid. The terpolymer preferably has a melt index within the range of about 3 to about 45 grams per 10 minutes.

Preferably the film of this invention is formed with an oriented saran layer, such that the self-adhering layer may be simultaneously adhered to itself during the process of heat shrinking the oriented saran layer. The self-adhering layer should bond to itself under such circumstances so as to have a cohesive strength from about 1 to about 16 pounds per inch of width (175 to 2800 N/M) and preferably from about 3 to about 5 pounds per inch of width (525 to 900 N/M). For purposes of this invention, cohesive strength is the strength of the bond formed between two opposing contacting layers of self-adhering material when the layers are subjected to low pressure and temperatures below the shrinkage temperature of the saran layer. Generally such temperature is preferably within the range of about 80° to 100° C. A sealing pressure is preferably from about 10 to about 20 p.s.i. (70 to 140 kPa). The film of this invention may be formed by any conventional technique. However, it is preferred to coextrude the two film layers as a tube and to orient the tube by the entrapped bubble technique. Generally the tube is extruded so as to have a thickness of about 3 to 4 mils (75 to 100 micrometers) with the saran layer generally composing about three-fourths of the thickness of the film. The film is oriented by known techniques at a temperature of about 150° F. (66° C.) and a blow up ratio between 4.5 and 6.5 to 1. This provides a film having a layer of saran of 1 to 2 mils (25 to 50 micrometers) and a self-adhering layer of about one-half mil (13 micrometers) in thickness and a shrinkage of 30 to 50 percent in the machine direction at 205° F. (96° C.). Such a film may be formed into bags or containers by known techniques such as by trim sealing the tube to provide a multiplicity of bags formed from cross sections of the tube.

While this description has emphasized the use of a two-ply laminate as a self-adhering material, it is to be understood that this invention is not limited to the number of plies so long as the additional plies do not deleteriously affect the optical quality or the self-adhering nature of the resulting laminate. The preferred embodiment of this invention, however, is a two-ply structure utilizing an oriented saran plasticized with the polyester of this invention with a self-adhering layer comprising the terpolymer of this invention.

Having above fully described the laminate film and its composition in accordance with this invention, the following specific example of the preferred embodiment of this invention is given as a further aid to the utilization thereof.

EXAMPLE 1

A layer of saran was produced from the following formulation:

| | |
|---|---|
| Di-n hexyl azelate | 4.5% |
| Di-isobutyl adipate | 2.0% |
| Polypropylene glycol adipate polyester | 3.0% |
| Epoxidized Linseed Oil | 1.0% |
| Amide Wax | 0.3% |
| Saran Resin | 89.2% |

The liquid components were heated and added to the saran resin in a blender. The mixture was then extruded through a standard plastic processing extruder at 300° F. (149° C.).

The self-adhering layer was formed of a terpolymer composed of 65 weight percent ethylene, 30 weight percent vinyl acetate and 5 weight percent acrylic acid which was extruded through a standard plastic processing extruder at 330° F. (166° C.).

A two-ply tubular extrusion die was utilized to extrude a tubular film of the two-ply composition. The self-adhering material was pumped through the inner die at a temperature of 300° F. (149° C.) while the saran polyester blend was pumped through the outer die at a temperature of 300° F. (149° C.).

The two layers were extruded and quenched in a water bath maintained at about 40° F. (5° C.). The extruded tape was reheated in a water bath to about 150° F. and then biaxially oriented by the entrapped bubble technique to a stretch ratio of about 5.5 to 1 in both directions. The thus extruded and oriented material was formed into bags six and three fourths inches by twelve and one-half inches (17×32 cm) by trim sealing techniques.

The bags as formed above were utilized for packaging ring sausage articles by inserting the articles into the bag, extracting air from the bag such that the bag in areas other than that occupied by the meat article were in contiguous relationship with the opposing surface of the bag. Upon extracting the atmosphere from the bag, the neck of the bag was sealed utilizing a conventional metal clip. The thus packaged article was submerged in a water bath maintained at a temperature of about 210° F. (99° C.) which caused the container to both shrink tightly about the packaged meat articles and to adhere to itself on contacting inner surfaces. The package was visually observed to be substantially transparent and noticeably less hazy than the prior art package. The surface within the center of the doughnut shaped article adhered tightly to itself so that it could be punctured without permitting atmosphere to permeate the area occupied by the meat article.

EXAMPLE 2

The haze, gloss and total transmission characteristics of various packaging materials were tested by ASTM standards D2457-70 and D1003. The characteristics were measured after about two months storage. The samples utilized in this test were as follows:
  Sample 1. Commercially available prior art film.
  Sample 2. Film produced in accordance with Example 1.
  Sample 3. Film utilizing saran polyester composition of Example 1 but utilizing as the self-adhering layer the prior art ethylene vinyl acetate copolymer.
  Sample 4. A laminate of conventionally plasticized saran utilizing the terpolymer of this invention as the self-adherent layer.

The data for each sample appears below.

| | Sample 1 | | | |
|---|---|---|---|---|
| | Haze | Gloss | Total Transmission | Gauge (Mils) |
| Average | 18.1 | 71 | 88.7 | 1.88 |
| Std. Dev. | 1.5 | 2 | 0.6 | 0.08 |
| 95% C.L. | 2.3 | 3 | 1.0 | 0.13 |
| | Sample 2 | | | |
| | Haze | Gloss | Total Transmission | Gauge (Mils) |
| Average | 11.6 | 71 | 90.7 | 1.67 |
| Std. Dev. | 0.6 | 1 | 0.4 | 0.11 |
| 95% C.L. | 1.0 | 2 | 0.7 | 0.17 |
| | Sample 3 | | | |
| | Haze | Gloss | Total Transmission | Gauge (Mils) |
| Average | 28.6 | 52 | 87.0 | 1.59 |
| Std. Dev. | 4.6 | 0 | 1.4 | 0.02 |
| 95% C.L. | 7.2 | 1 | 2.3 | 0.04 |

The fourth sample was visually observed and was noted to be no less cloudy than either samples 1 or 3. It is thus seen that the laminate formulation of this invention produces a material with synergistically improved optical properties. It is significant to note that the laminate of this invention embodies about a 36% reduction in the haze of the prior art laminate. It is further significant to note that it is necessary to use both the polyester plasticized saran composition as well as the terpolymer composition of this invention in order to produce such a substantial reduction in haze.

EXAMPLE 3

A second set of samples corresponding to Samples 1, 2, 3 and 4 as defined above were coextruded on the same day from the same die within a period of time of about four hours. The haze of each of the samples was measured by the ASTM standard used in Example 2. The measurement was made on all samples at substantially the same time within a period of about two weeks after the samples were produced.

| | Sample 1 | |
|---|---|---|
| Optical Properties | Haze | Gauge (Mils) |
| Average | 15.5 | 1.74 |
| Std. Dev. | 1.0 | 0.12 |
| 95% C.L. | 1.5 | 0.19 |
| | Sample 2 | |
| Optical Properties | Haze | Gauge (Mils) |
| Average | 10.2 | 1.72 |
| Std. Dev. | 1.0 | 0.24 |
| 95% C.L. | 1.5 | 0.38 |
| | Sample 3 | |
| Optical Properties | Haze | Gauge (Mils) |
| Average | 12.7 | 1.92 |
| Std. Dev. | 1.8 | 0.20 |
| 95% C.L. | 2.8 | 0.33 |
| | Sample 4 | |
| Optical Properties | Haze | Gauge (Mils) |
| Average | 11.6 | 1.84 |
| Std. Dev. | 0.2 | 0.12 |
| 95% C.L. | 0.4 | 0.19 |

While the table indicates that the samples not embodying the two ply structure of this invention have a lower haze than the corresponding samples in Example 2, the two ply laminate of this invention also has a lower haze. The period of time after sample production and prior to measurement of the haze characteristic is significant in that a comparison of Example 3 with Example 2 indicates that the two ply laminate of this invention has the ability to retain a low haze for a long period of time whereas the remaining samples increase in haze over a period of time.

EXAMPLE 4

The samples utilized in Example 3 were aged for three months and remeasured for haze in accordance with the ASTM technique described above. The results are summarized in the table below.

Table

| | Haze from Example 3 | Haze after aging | Difference |
|---|---|---|---|
| Sample 1 | 15% | 17% | +2% |
| Sample 2 | 10% | 9% | −1% |
| Sample 3 | 13% | 15% | +2% |
| Sample 4 | 12% | 14% | +2% |

It is seen that the sample of this invention (Sample 2) actually descreased in haze after aging while the remainder of the samples increased after a three month aging.

EXAMPLE 5

In order to test the adhesive and delamination qualities of the samples tested in Example 2, each of the samples was placed in a heated oven maintained at 120° F. (50° C.). The samples were checked periodically and any delamination observed. The extent of delamination is summarized in the following table.

| Hrs. in oven at 120° F. | Degree of Delamination | | | |
|---|---|---|---|---|
| | Sample 1 | Sample 2 | Sample 3 | Sample 4 |
| 2 hrs. | none | none | very, Very slight | none |
| 4 hrs. | very, very slight | none | slight | very, very slight |
| 8 hrs. | very slight | none | moderate | slight |
| 24 hrs. | severe | none | total | severe |
| 48 hrs. | severe | moderate | total | severe |

It should be noted that the laminate of this invention had only moderate delamination after 48 hours under such severe conditions. This is an extremely important criterion for a packaging material which is subjected to the rigors and temperatures involved in shipping and storage. It is seen that the laminate of this invention is highly superior to the prior art laminate and is synergistic in its ability to withstand delamination under such severe conditions in that combinations employing only one of the improved layers of this invention readily delaminate.

It is thus that the laminate film of this invention provides a self-adherent laminate composition with greatly improved clarity as compared to the prior art composition. It is further seen that the laminate of this invention has a surprising improvement in the layer adhesion. It is to be understood that the preferred embodiment of this invention as set forth above is for illustrative purposes and that the scope of this invention is to be measured by the following appended claims.

What is claimed is:

1. In a packaging material comprising two layers, one layer being a self adherent material and the other layer being a saran layer, the improvement, comprising:

the combination of said saran layer being plasticized with a sufficient amount of polyester to plasticize said saran, said polyester having a molecular weight between 1,000 and 10,000, said polyester being the product of an equimolar esterification reaction between adipic acid, azelaic acid or sebacic acid and propylene glycol, 1,3-butane diol, 1,4-butane diol or neopentyl glycol wherein the end group of the polyester is hydroxyl, carboxyl or esterified by aliphatic (C1 to C18), alicyclic aliphatic, heterocyclic or aromatic monocarboxylic acids or monoalcohols; and said self-adhering layer being a terpolymer of ethylene, a vinyl ester, and an alkenoic acid, with at least 60 weight percent ethylene, 20 to 40 weight percent vinyl ester and 0.1 to 10 weight alkenoic acid.

2. The improvement according to claim 1 wherein said saran is a copolymer of vinylidene chloride and vinyl chloride containing from about 70 to about 90 weight percent of vinylidene chloride and from 10 to about 30 weight percent of vinyl chloride.

3. The improvement according to claim 1 wherein the vinyl ester of said terpolymer is selected from the group consisting of vinyl acetate, vinyl propionate, methylmethacrylate, ethyl methacrylate, ethylacrylate and isobutylacrylate.

4. The improvement according to claim 3 wherein said vinyl ester is vinyl acetate.

5. The improvement according to claim 1 wherein the alkenoic acid of said terpolymer is an alpha beta ethylenically unsaturated carboxylic acid having from 3 to about 10 carbon atoms per molecule of the acid.

6. The improvement according to claim 5 wherein said alkenoic acid is selected from the group consisting of acrylic acid, methacrylic acid, itaconic acid, methylhydrogen maleate, maleic acid, acrylic acid methacrylic acid.

7. The improvement according to claim 1 wherein said laminate is oriented so as to provide a heat shrinkage of 30 to 70 percent in at least one direction at 205° F.

* * * * *